United States Patent
Thomas et al.

(10) Patent No.: US 7,384,064 B2
(45) Date of Patent: Jun. 10, 2008

(54) DRIVER AIR BAG MODULE AND METHOD OF ASSEMBLY

(75) Inventors: Scott David Thomas, Novi, MI (US); Nancy C. Evans, Clinton Township, MI (US)

(73) Assignee: General Motors Corporation, Detroit, MI (US)

( * ) Notice: Subject to any disclaimer, the term of this patent is extended or adjusted under 35 U.S.C. 154(b) by 420 days.

(21) Appl. No.: 10/828,421

(22) Filed: Apr. 20, 2004

(65) Prior Publication Data

US 2005/0230938 A1 Oct. 20, 2005

(51) Int. Cl.
B60R 21/16 (2006.01)
B60R 21/203 (2006.01)

(52) U.S. Cl. .................... 280/731; 280/728.2
(58) Field of Classification Search .......... 280/728.2, 280/731
See application file for complete search history.

(56) References Cited

U.S. PATENT DOCUMENTS

| | | | |
|---|---|---|---|
| 5,354,093 A | 10/1994 | Schenck et al. | 280/728 |
| 5,409,256 A | 4/1995 | Gordon et al. | 280/728 |
| 5,431,432 A | 7/1995 | Webber et al. | 280/728.2 |
| 5,433,471 A | 7/1995 | Shepherd et al. | 280/728.2 |
| 5,496,057 A | 3/1996 | Niederman | 280/728.2 |
| 5,762,359 A * | 6/1998 | Webber et al. | 280/728.2 |
| 6,029,992 A * | 2/2000 | Vendely et al. | 280/728.2 |
| 6,036,222 A | 3/2000 | Holmes et al. | 280/728.2 |
| 6,062,595 A | 5/2000 | Ha | 280/731 |
| 6,367,835 B1 * | 4/2002 | Maguire | 280/728.2 |
| 6,431,582 B1 | 8/2002 | Ennis et al. | 280/728.2 |
| 6,811,181 B2 * | 11/2004 | Hauer | 280/731 |
| 2001/0048216 A1 * | 12/2001 | Varcus et al. | 280/728.2 |
| 2004/0070185 A1 * | 4/2004 | Xu | 280/731 |
| 2005/0179236 A1 * | 8/2005 | Nash et al. | 280/728.2 |

OTHER PUBLICATIONS

General Motors Performance Assessment Committee Report, illustrating an air bag module for use on 2004 Midsize Trucks, issued 2000, p. 34 of 83.
General Motors Performance Assessment Committee Report, illustrating an air bag module for use on 2003 Full Size Vans, issued Oct. 2001, p. 30 of 89.

* cited by examiner

Primary Examiner—Ruth Ilan
Assistant Examiner—Barry Gooden, Jr.

(57) ABSTRACT

An air bag module includes an inflatable cushion, an inner plate receivable within the cushion and a cover adapted to contain the cushion prior to inflation thereof. The inner plate and cushion are receivable within the cover. The base plate attaches to the inner plate. A portion of the cushion and a portion of the cover abut one another and are sandwiched directly between the base plate and the inner plate. The sandwiched portion of the cover is retained between the inner plate and the base plate (and preferably cupped by the base plate). The cushion, cover and attached inner plate and base plate remain retained to one another when the cushion is inflated. A method of assembling the air bag module is also provided.

25 Claims, 3 Drawing Sheets

DRIVER AIR BAG MODULE AND METHOD OF ASSEMBLY

TECHNICAL FIELD

This invention relates to driver-side air bag modules and a method of assembling the same.

BACKGROUND OF THE INVENTION

Passenger vehicles are typically fitted with driver-side air bags. Such air bags are usually contained in an air bag module which is attached to the vehicle's steering wheel. The module typically contains an inflator and a cover enclosing the air bag. The cover is formed with weakened areas which the inflating air bag ruptures to enable the air bag to deploy into an interior space of the vehicle. The cover must be secured to the inflator sufficiently to prevent the cover from separating from the air bag module during inflation. The air bag module typically contains numerous components which are attached and connected by a variety of fasteners, rivets or other attachment means. Accordingly, the air bag module's structure is usually complex. The air bag module is typically assembled as a module prior to connection to the steering wheel assembly.

SUMMARY OF THE INVENTION

It is therefore an object of this invention to provide an air bag module having a cover that is sufficiently secured to the air bag module at all times, including before, during and after inflation of the air bag cushion, and yet includes a minimum number of components and requires only a minimal number of steps to assemble the module.

Accordingly, an air bag module includes an inner plate. A base plate is attachable to the inner plate. Preferably, the base plate is a unitary structure. The air bag module further includes a cover and an inflatable cushion. The inner plate is receivable within the cushion. The cushion and the inner plate are receivable within the cover. The cover contains the cushion prior to inflation of the cushion. A portion of the cushion and a portion of the cover abut one another and are sandwiched directly between the inner plate and the base plate such that the sandwiched portion of the cover is retained between the base plate and said inner plate. Preferably, the sandwiched portion of the cover is cupped by the base plate. An inflator that creates gas to fill the cushion may be sandwiched between the base plate and the inner plate or be located adjacent to one of these components. The cushion, the cover, and the attached inner plate, the base plate, and the inflator are retained to one another when the cushion is inflated.

In another aspect of the invention, the air bag module includes a fastener element adapted to extend through the inner plate, the cushion and the base plate. The fastener element attaches the inner plate and the base plate.

In one aspect of the invention, the cushion, the inner plate and the base plate are each formed with an alignable fastener element opening. The fastener element openings are adapted to receive the fastener element through the opening when the openings are aligned.

In another aspect of the invention, the cover includes a cover extension having an inwardly-jutting flange portion. The cover extension is matable with the base plate such that the flange portion abuts and is cupped by the base plate and the portion of the cushion abuts and is disposed between the inner plate and the cover extension.

In another aspect of the invention, the base plate forms a segmented channel. The flange portion of the cover extension has opposing inner and outer surfaces. The channel abuts the outer surfaces of the flange portion and the cushion is sandwiched between the inner plate and the inner surface of the flange portion when the cover extension is mated with the base plate.

In another aspect of the invention, the inner plate includes a peripheral wall having an outer surface. The cover extension includes a shoulder portion. The flange portion juts inward from the shoulder portion, further sandwiching the cushion between the peripheral wall and the shoulder portion.

In yet another aspect of the invention, the air bag module includes an inflator having a mounting flange. The fastener element is adapted to further extend through the inner plate and the mounting flange, thereby attaching the inflator with the cushion, the inner plate, the base plate and the cover. Preferably, the cushion, the inner plate, the base plate and the inflator are each formed with alignable fastener element openings adapted to receive the fastener element through the fastener openings when such openings are aligned.

In a further aspect of the invention, the cushion, the inner plate and the base plate are each formed with an alignable inflator opening. The alignable inflator openings are adapted to receive a portion of the inflator. The mounting flange of the inflator abuts and is sandwiched between the cushion and the base plate when the inflator is received within the aligned inflator openings and is attached with the cushion, the inner plate and the base plate by the fastener element.

In a further aspect of the invention, the cushion, the inner plate and the base plate are each formed with an alignable inflator opening. The alignable inflator openings are adapted to receive a portion of the inflator. The mounting flange of the inflator abuts an outer surface of the base plate and is fastened to the module assembly by the fastener elements.

In a further aspect of the invention, the inflator is isolated from surrounding airbag structure by a viscous damping element so that it can function as a mass damper to absorb steering wheel and column vibrations. An optional weighting element may abut the inflator to tone the damping (i.e., increase the mass damping function of the inflator).

In another aspect of the invention, the viscous damping element is sandwiched between the inner plate and the base plate. In this instance, the viscous damping element is located between the inflator and the inner plate and inward of the fasteners. Alternatively, the viscous damping element may be located between the inflator and the outer surface of the base plate and inward of the fastener elements when the inflator is located "outside" of the base plate (i.e., on the opposite side of the base plate than the inner plate). The air bag module further includes structure operable to at least partially limit compression of the viscous damping element by the attached inner plate and base plate.

In another aspect of the invention, the fastener element comprises a protrusion extending through the inner plate, the cushion and the base plate. The fastener element may further comprise a retaining element. The protrusion may be secured by the retaining element to attach the inner plate, the cushion, the base plate and the cover together. For example, the protrusion may be a threaded bolt and the retaining element may be a threaded nut matable with the bolt to secure the protrusion, thereby attaching the inner plate, cushion, base plate and cover together. Alternatively, the protrusion may be integrally formed with the inner plate. For example, the protrusion may be a portion of the inner plate configured to extend toward the base plate. For example, the protrusion may be a "foot" having a variety of shapes extending from the inner plate toward the base plate. A variety of retaining elements matable with the particular type of protrusion may be employed. For example, a protrusion formed with an integral cavity may be secured by a retaining element formed with a finger portion matable with the cavity. Alternatively, protrusions formed with T-shaped or L-shaped feet may be secured by retaining elements formed with suitable finger portions designed to secure the specific shape of the protrusion.

In another aspect of the invention, either the retaining element or a portion of the air bag module may be made of a deformable material so that when the retaining element secures the protrusion, the deformable material deforms to enable the securement of the protrusion.

In another aspect of the invention, the fastener element may be a deformable tab. The deformable tab is deformed to attach the inner plate and the base plate. The deformable tab may include a T-shaped foot having a neck portion. The neck portion may wedge into the base plate when the deformable tab is deformed, thereby further securing the detachment of the inner plate, the cushion, the base plate and the cover together.

A method of assembling an air bag module includes providing an inflatable cushion. The method further includes placing an inner plate within the cushion. The method further includes extending fastener elements between the inner plate and the cushion such that the fastener elements pass through aligned openings in the inner plate and the cushion. The method further includes placing the inner plate and the cushion at least partially within a cover such that a portion of the cushion is sandwiched between the inner plate and the cover. The method further includes positioning a base plate against the cover to cup a portion of the cover such that the portion of the cushion and the portion of the cover are sandwiched between the inner plate and the base plate. The method further includes securing the fastener elements to attach the inner plate, the cushion, the cover and the base plate sufficiently to prevent separation of the cover from the base plate and the inner plate due to inflation of the cushion.

In one aspect of the invention, the method may include positioning an inflator at an opening of the inner plate such that the inflator abuts the cushion and the inner plate. The base plate further sandwiches a portion of the inflator between the inner plate and the base plate. Securing the fastener elements attaches the inflator with the inner plate, the cushion, the cover and the base plate.

Alternatively, in another aspect of the invention, the method may include positioning an inflator at an opening of the base plate such that the inflator abuts an outer surface of the baseplate. Securing the fastener elements attaches the inflator to the module In one aspect of the invention, the fastener elements include a retaining feature. Securing the fastener elements includes positioning the retaining feature.

In another aspect of the invention, securing the fastener elements includes deforming the fastener elements.

The above features and other features and advantages of the present invention are readily apparent from the following detailed description of the best modes for carrying out the invention when taken in connection with the accompanying drawings.

DESCRIPTION OF THE PREFERRED EMBODIMENTS

Figures 1A, 1B:
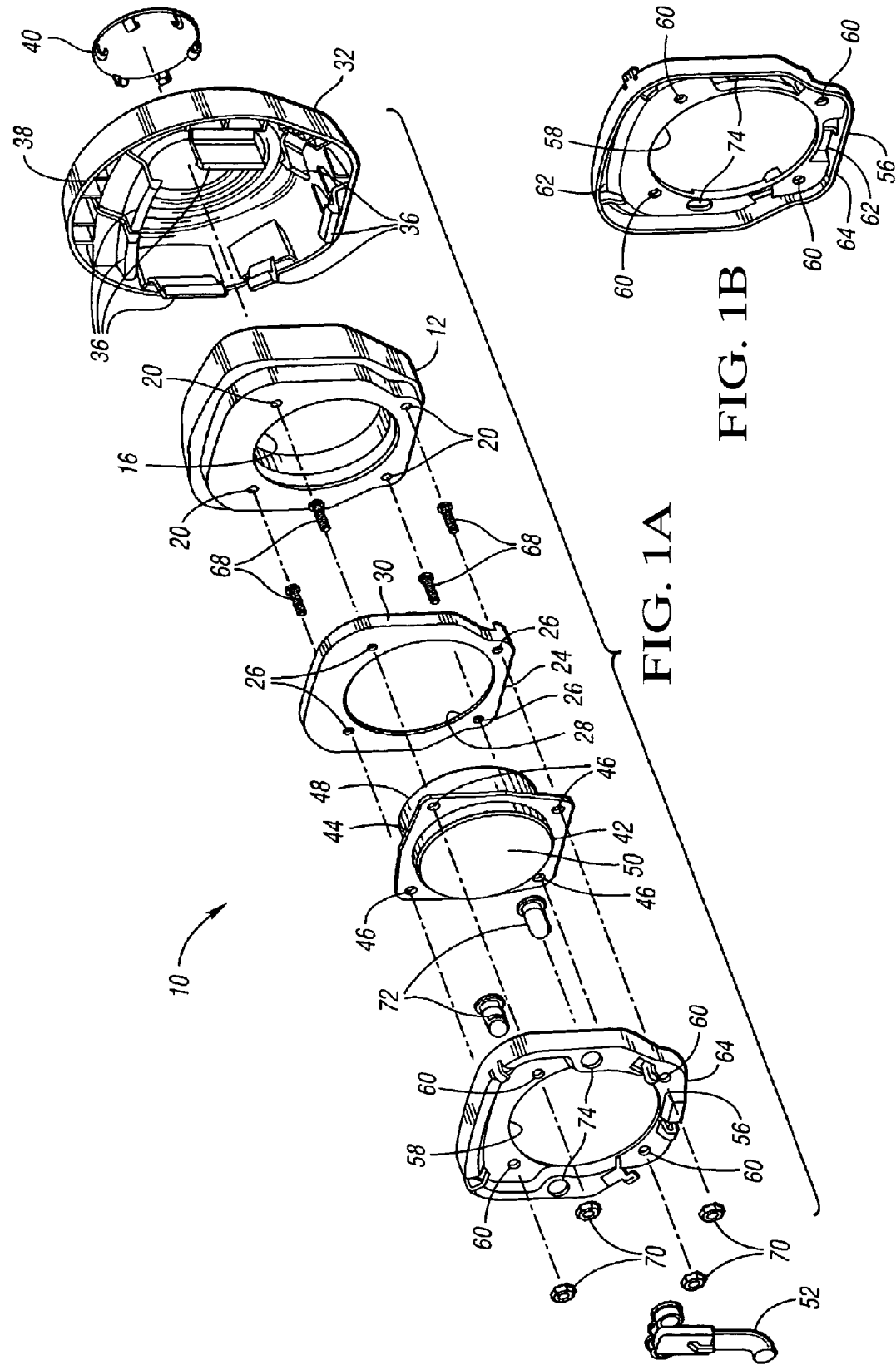
FIG. 1A is a schematic perspective exploded view of an air bag module including a base plate and an inner plate.
FIG. 1B is a schematic perspective rotated view of the base plate of FIG. 1A.

Referring to the drawings, wherein like reference numerals refer to like components, FIG. 1A depicts an air bag module 10. A cushion 12, which may otherwise be referred to as an air bag, is shown in the folded state. The cushion 12 includes a central opening 16 which may be referred to as an inflator opening. The cushion has a plurality of fastener element openings 20. An inner plate 24 may be received (i.e., placed) within the cushion 12 by placing it through the inflator opening 16. Slit-like extensions (not shown) may be required in the cushion at the central opening 16 in order to place the inner plate 24 within the cushion 12. The inner plate 24 also includes fastener element openings 26 and threaded studs 68. When the inner plate 24 is placed within the cushion 12, the fastener element openings 20 in the cushion 12 are aligned with the threaded studs 68 in the inner plate 24. The threaded studs 68 would likely be pressed into the inner plate 24 prior to inserting inner plate 24 into the cushion 12. The inner plate 24 is further formed with a central opening 28 which may also be referred to as an inflator opening.

The cushion 12, with the inner plate 24 placed therein, may be placed within a cover 32. The cover 32 contains the cushion 12 prior to inflation of the cushion 12. The cover 32 is formed with weakened areas (not shown) designed to rupture upon inflation of the cushion 12, permitting the cushion 12 to be deployed outside of the cover in an interior space of a vehicle. Those skilled in the art will readily understand the function of weakened areas in the cover. A plurality of cover extensions 36 extend from the cover 32 around a periphery 38 of the cover 32. An optional emblem 40 is mountable to the cover 32.

An inflator 42 is formed with a mounting flange 44. Fastener element openings 46 are formed in the mounting flange 44. A domed portion 48 of the inflator may be received within the central opening 16 of the cushion and the central opening 28 of the inner plate 24. The fastener element openings 46 and the inflator 42 may be aligned with the fastener element openings 20 fastener element openings 24 of the cushion 12 and inner plate 24 and the threaded studs 68, respectively. The inflator 42 is formed with electrical connector openings (not shown) on an underside 50 of the inflator. An actuator 52 may be mounted to the inflator 42 at the electrical connector openings. Those skilled in the art will readily understand the use of an electric signal to ignite inflation gases contained within the inflator 42, thus inflating the cushion 12.

A base plate 56 is formed with a central opening 58 and the plurality of fastener element openings 60. The base plate 56 is a unitary structure. As may be viewed in the rotated image of the base plate 56 in FIG. 1B, a segmented channel 62 is formed about a periphery 64 of the base plate 56. Steering wheel assembly mounting elements 72 are receivable within steering wheel mounting element openings 74 of base plate 56 and are used to mount the air bag module 10 to the steering wheel assembly of a vehicle (not shown). Referring to FIG. 1A, the base plate 56 may be placed upon the mounting flange 44 of the inflator 42 with the bottom portion 50 of the inflator extending through the central opening 58 of the base plate 56. The fastener element openings 60 of the base plate are aligned with the fastener element openings 20 in the cushion, the fastener element openings 26 in the inner plate, the fastener element openings 46 of the inflator and the threaded studs 68. When the base plate 56 is placed against the mounting flange 44 of the inflator (the inflator 42, the inner plate 24 the cushion 12 and the cover 32 having been previously assembled as discussed above), portions of the cushion 12 and the cover extensions 36 of the cover 32 abut one another and are captured or sandwiched between the base plate 56 and the inner plate 24. Mating nuts 70 are attached to the threaded studs 68 to attach the assembled inner plate 24, cushion 12, cover 32, inflator 42 and base plate 56 together.

Figure 2A:
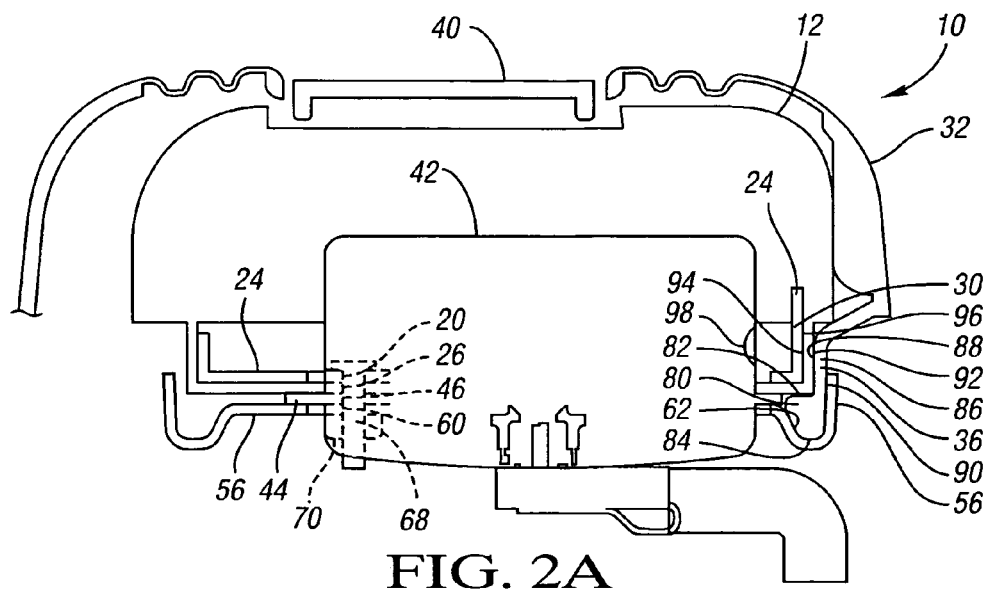
FIG. 2A is a schematic partial cross-sectional view of the air bag module of FIG. 1A.

Referring to FIG. 2A, a schematic representation of the assembled air bag module of FIG. 1A is shown. As may be viewed in FIG. 2A, the cover extension 36 has an inwardly jutting flange portion 80. The flange portion 80 has an inner surface 82 and an outer surface 84. The cover extension 36 is matable with the base plate 56 such that the flange portion 36 abuts and is cupped by the base plate 56. The channel 62 of the base plate 56 mates with the cover extension 36. When assembled, the channel 62 of the base plate 56 abuts the outer surface 84 of the flange portion 36 and an outer surface 92 of the cushion 12 abuts the inner surface 82 of the flange portion 80. As may be viewed in FIG. 2A, the cushion 12 is sandwiched between the inner plate 24 and the inner surface 82 of the flange portion when the cover extension 36 is mated with the channel 62 of the base plate 56. Other cover extensions 30 (shown in FIG. 1) are mated with the channel 62 at other locations about the base plate 56 similarly to the extension 36 shown in FIG. 2A.

The peripheral wall 30 of the inner plate 24 has an outer surface 96. The flange portion 80 of the cover extension 36 juts inward from the shoulder portion 86. The cushion 12 is further sandwiched between the outer surface 96 of the peripheral wall 30 of the inner plate 24 and the shoulder portion 86 of the cover extension 36. Thus, the inner plate 24 acts to retain the cushion 12 and also functions, along with the base plate 56, to hold the cushion 12, cover 32 and inflator 42 together. By providing a peripheral wall 30 on the inner plate 24, a metal layer is placed between the cushion 12 and an inflator nozzle 98, thereby reducing gas impingement on the cushion 12. (A plurality of inflator nozzles, such as inflator nozzle 98, are on the inflator 42, only one being shown.) Additionally, the peripheral wall 30 provides a greater surface area over which the cushion 12 and the inner plate 24 contact one another. Accordingly, stress on the cushion is reduced in comparison to an inner plate lacking a peripheral wall (e.g., a substantially flat inner plate), helping to maintain cushion integrity. Notably, the peripheral wall 30 is continuous about the periphery of the inner plate 24 (see FIG. 1A), providing the stress-reduction function about the entire periphery.

The mounting flange 44 of the inflator 42 abuts and is sandwiched along with the cushion 12 between the inner plate 24 and base plate 56 when the inflator 44 is attached with the cushion 12, the inner plate 24 and the base plate 56 by fastener elements. Each fastener element includes a protrusion and a retaining element, consisting in this embodiment of a threaded stud 68 and a nut 70 (shown in FIG. 2A). In the assembled air bag module 10, the fastener element openings 20, 26, 46 and 60 of the cushion 12, inner plate 24, inflator 42 and base plate 56, respectively, are aligned such that the fastener elements (threaded stud 68 and nut 70) is received within the aligned openings and extend between the inner plate 24, the cushion 12, the base plate 56 and the inflator 42, thereby attaching these components together. The fastener elements (threaded stud 68 and nut 70) are sufficient to attach the cushion 12, inner plate 24, inflator 42 and base plate 56. Additionally, the cover extensions 36 abut the cushion 12 and are sandwiched along with the cushion 12 directly between the inner plate 24 and base plate 56 (as discussed above). Accordingly, the air bag module 10 is held together and the cover 32 is retained at the base plate 56 even during inflation of the cushion 12 sufficiently to prevent separation of the cover 32 from the base plate 56. Additional attachment mechanisms are not necessary to secure the attachment of the cushion 12, the inner plate 24, the inflator 42 and the base plate 56. This sandwiched arrangement, being cupped by the base plate 56, enables reliable retention of the sandwiched parts to one another before, during and after inflation of the cushion 12, while requiring only a minimal number of parts.

Figure 2B:
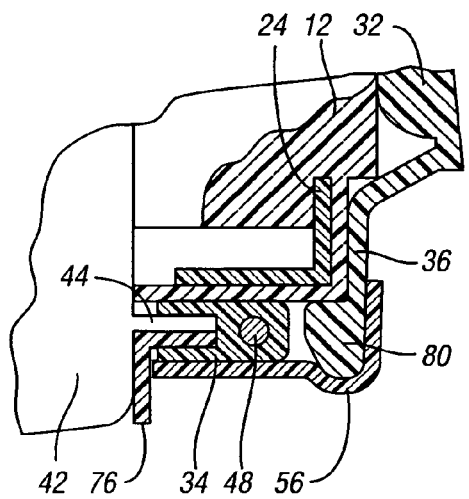
FIG. 2B is a schematic partial cross-sectional fragmentary view of an air bag module having a viscous damping element.

Referring to FIG. 2B, an optional viscous damping element 34 may be placed around the mounting flange 44 of the inflator 42 to isolate the inflator 42 from direct contact with the surrounding structure of the base plate 56, inner plate 24, and fastener elements such as threaded studs 68 (not shown). The viscous damping element 34 allows the inflator 44 to function as a mass damper, absorbing vehicle vibrations transmitted up the steering column (not shown) to the steering wheel (not shown).

The flange portion 80 of the cover extensions 56 may be sized in height so that the viscous damping element 34 is not overly compressed between the base plate 56 and the inner plate 24. Alternatively, an optional damping material stiffener 48 could be included on the viscous damping element 34 to prevent the viscous damping element 34 from being overly-compressed when the nuts 70 are driven onto the threaded studs 68 (nuts 70 and threaded studs 68 shown in FIG. 2A). Another option is to form the base plate 56 with portions extending toward the cushion 12 and inner plate 24, creating localized areas where the base plate 56 can bottom out (i.e., contact) on the cushion 12 and the inner plate 24 before the viscous damping material 34 becomes overly-compressed. Optionally, a weighting element 76 may be added to tune the mass of the mass damper system. The weighting element 76 may be optionally press fit or swaged onto the inflator 42.

Figure 2C:
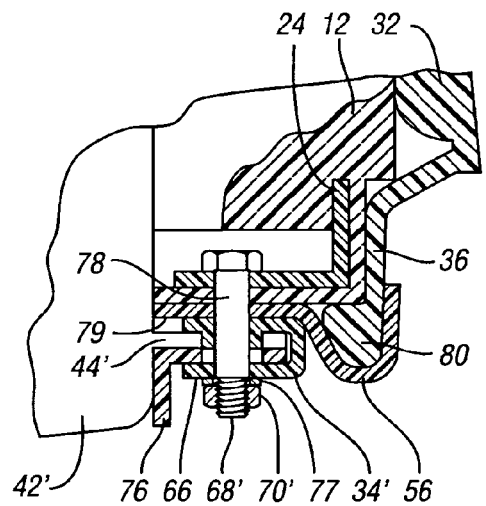
FIG. 2C is a schematic partial cross-sectional fragmentary view of another embodiment of an air bag module having a viscous damping element.

Referring to FIG. 2C, the inflator 42' can be located so that its mounting flange 44' is outside of the base plate 56 (i.e., on an opposing side of the base plate 56 than the inner plate 24). Threaded studs 68 and nuts 70 would hold the inflator 42' in place after assembly. With the inflator 42 in this location, it is also possible to add optional viscous damping element 34' to isolate the inflator 42' and mounting flange 44' from adjacent structure of the base plate 56, threaded studs 68' and nut 70'. (Note that without the optional viscous damping element 34', the inflator 42 would abut outer surface 79 of the base plate 56'.) Structure such as a washer element 77 and a threaded stud 68' with a partially threaded shaft 78 may be needed to avoid over-compressing the viscous damping element 34' during assembly. It can also be noted that a similar viscous damper arrangement could be used if the inflator was positioned so that its mounting flange 42 was located inside the inner plate 24 (i.e., on the opposite side of the inner plate 24 than shown in FIGS. 2B-2C).

Figure 3:
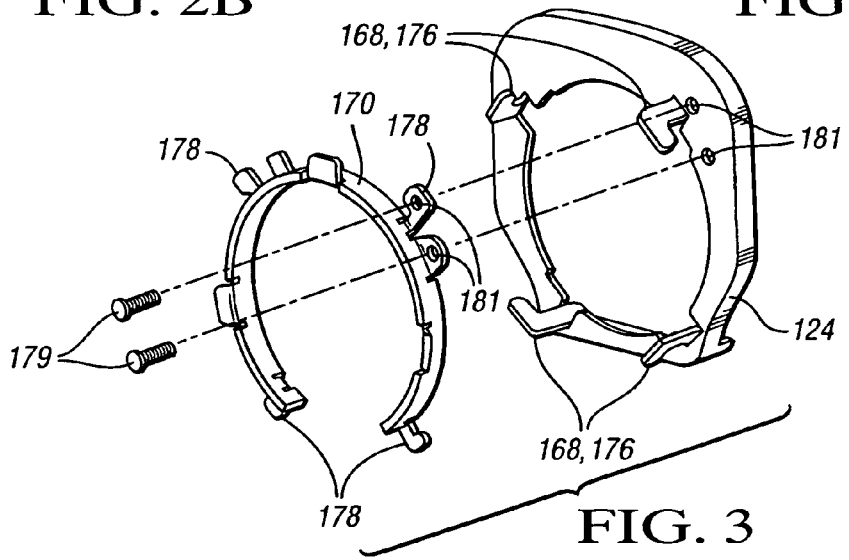
FIG. 3 is a schematic perspective exploded view of an alternative embodiment of an inner plate having protrusions as well as a retaining element for use within an air bag module.

Referring to FIG. 3, an alternative embodiment of an inner plate 124 having protrusions 168 and a retaining element 170 are shown. The protrusions 168 each include an L-shaped foot portion 176. The retaining element 170 includes interlocking tabs 178 spaced to interlock with the L-shaped foot portions 176 of the inner plate 124 when the air bag module is assembled. In this embodiment, fastener openings in the cushion, the inflator flange and a base plate of the assembled air bag module would have a slot adapted to receive each of the L-shaped foot portions 176 of the protrusions 168. A retaining element securing feature 179, in this case threaded studs, may be placed through retaining element securing feature openings 181 formed in both the retaining element 170 and the inner plate 124, to secure the retaining element 170 into a locked position with the inner plate 124, ensuring that the L-shaped foot portions 176 remain interlocked with the interlocking tabs 178. This locked position may be attained by rotating the retaining element 170 with respect to the inner plate 124 such that the foot portions 176 and the interlocking tabs 178 interlock as described above.

Figure 4A:
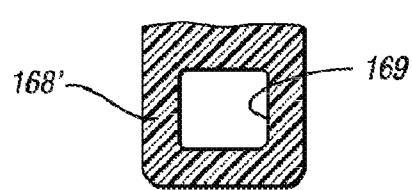
FIGS. 4A-4D are schematic cross-sectional fragmentary views of various embodiments of protrusions of fastener elements.

Referring to FIGS. 4A-D, a variety of differently shaped protrusions from the inner plate such as 124 are contemplated within the scope of the invention. Referring to FIG. 4A, protrusion 168' has an opening 169. The opening 169 is designed to be interlocked with a complementary shaped interlocking tab on a retaining element to lock the protrusion 168'. For instance, referring to FIG. 5A, an alternative embodiment of a retaining element 170' incorporates interlocking tabs 178'. Tabs 178' are designed to engage with appropriately spaced protrusions 168' by fitting within the opening 169. In this case, the retaining element 170' may translate into an interlocked position with the protrusions 168'.

Figure 4B:
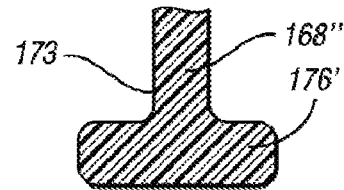
Figure 5A:
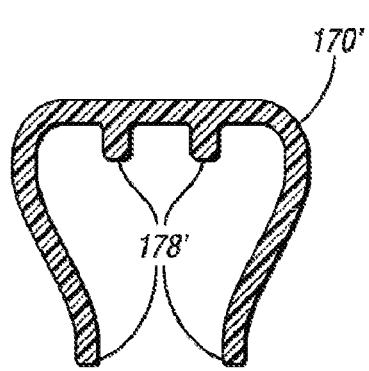
FIGS. 5A-5C are schematic cross-sectional fragmentary views of various embodiments of retaining features included within fastener elements.
Figure 5B:
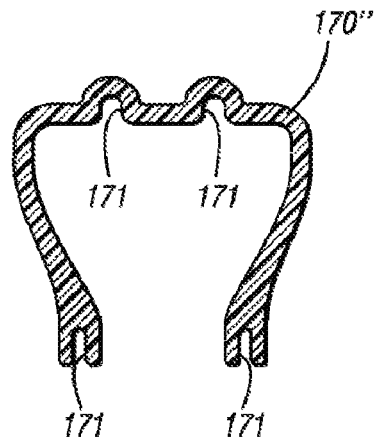

Referring to FIG. 4B, protrusions 168" have a T-shaped foot portion 176'. Such a protrusion 168" may be used in conjunction with a retaining element 170" as shown in FIG. 5B. Retaining element 170" has notches 171 appropriately spaced to engage with the protrusions 168" extending from an inner plate (not shown) translating into a position such that neck portions 173 of each protrusion 168" fits within notched portions 171 of the retaining element 170".

With respect to any of the protrusions and retaining elements described herein, either the retaining element or the protrusion may be comprised of a deformable material such that the deformable material deforms to secure the protrusions with the retaining element. For instance, referring to FIGS. 4A and 5A, the protrusion 168' may be comprised of a deformable material such that when the interlocking tab 178' is translated into the opening 169, the material about the opening deforms, thus helping to lock or secure the protrusion 168' to the interlocking tab 178'. Alternatively, the interlocking tab 178' may deform upon translation into the opening 169, expanding to secure the tab 178' within the opening 169. The neck portion 173 of the protrusion 168" of FIG. 4B or the material about the notches 171 of the retaining element 170" of FIG. 5B may similarly be deformable to help insure secure engagement of the protrusions 168" and the retaining element 170".

Figure 4C:
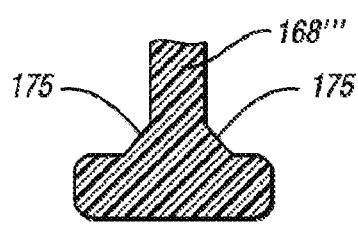
Figure 4D:
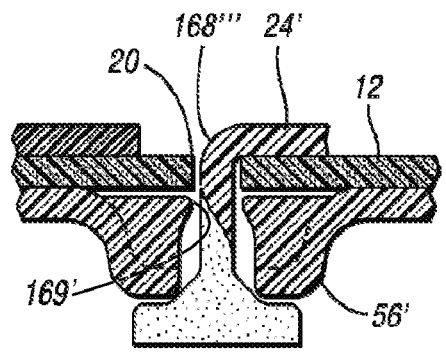

Referring to FIG. 4C, the protrusion 168''' is comprised of a deformable, bendable material. As shown in FIG. 4D, the protrusion 168''' of an inner plate 24' is twisted or bent about the cushion 12 and the base plate 56' by extending the protrusion 168''' through the alignable slotted fastener element openings 20, 60 in the cushion 12 and base plate 56', respectively. Referring again to FIG. 4C, the bendable fastener tab type of protrusion 168''' may include a neck portion 175 that wedges into the base plate 56' when the deformable tabs 168''' are deformed. To accomplish this wedging, the fastener element openings 60 in the base plate 56' would be sized such that the neck portion 175 is aligned with, and wedges into, the fastener element openings 60 when the protrusion 168''' is bent, twisted or deformed. The base plate 56' is formed with a thickened area 169' to help accomplish the twisting and wedging action. The wedging further secures attachment of the inner plate, cushion, base plate and cover together.

Figure 5C:
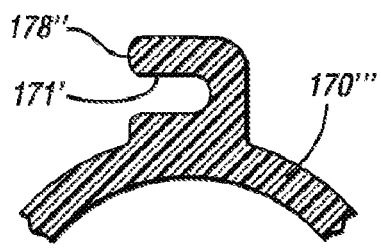

Referring to FIG. 5C, an alternative embodiment of an interlocking tab 178" is shown. The interlocking tab 178" has a notch 171' similar to the notch 171 of FIG. 5B. The retaining element 170" may be a rotational type retaining element that locks onto protrusions as does retaining element 170 shown in FIG. 3. The notched portion 171' is designed to fit snuggly about the protrusion. For instance, if used with the inner plate 124 of FIG. 3, the notched portion 171' would engage with the protrusions 168 just above the L-shaped foot portion 176.

The method of assembling an air bag module, such as air bag module 10 of FIG. 1A, includes providing an inflatable cushion 12. The method includes placing an inner plate 24 within the cushion 12. The method further includes extending fastener elements (including, e.g., threaded stud 68) between the inner plate and the cushion such that the fastener elements pass through aligned fastener element openings 20, 26 in the cushion 12 and inner plate 24, respectively. The method further includes placing the inner plate 24 and cushion 12 at least partially within a cover 32 such that the cushion 12 is sandwiched between the inner plate 24 and the cover 32. In the air bag module 10 of FIG. 1A, the cushion 12 is folded and is completely contained within the cover 32 when placed within the cover.

The method of assembling an air bag module further includes positioning a base plate 56 against the cover 32 to cup a portion of the cover 32 such that the cushion 12 and the cover 32 are sandwiched between the inner plate 24 and the base plate 56. Finally, the method includes securing the fastener element to attach the inner plate 24, the cushion 12, the cover 32 and the base plate 56 sufficiently to prevent separation of the cover 32 from the base plate 36 and the inner plate 24 due to inflation of the cushion 12. A variety of fastener elements may be used, as discussed with respect to FIGS. 1 through 5C above. For instance, the fastener elements may include a retaining feature, such as threaded studs 68 and the nuts 70 of FIG. 1A or the retaining element 170, 170' 170", 170''' of FIGS. 3, 5A, 5B and 5C, respectively. In such case, securing the fastener element may include positioning the retaining feature. For instance, in the embodiment shown in FIG. 3, securing the protrusions 168 may require rotating the retaining feature 170 into position such that the interlocking tabs 178 interlock with the L-shaped foot portion 176 of the protrusions 168. Furthermore, securing the fastener elements may include deforming the fastener elements. For instance, as described with respect to FIGS. 4C-D above, the protrusion 168''' is deformed to secure the inner plate 24 to the cushion 12 and base plate 56.

The air bag module within the scope of the invention may include an inflator. In that case, the method of assembling the air bag module 10 further includes positioning the inflator 42 at a central opening 28 in the inner plate 24 (shown in FIG. 1A) such that the inflator 42 abuts the cushion 12 and inner plate 24. Positioning the inflator is done prior to securing the fastener elements. When the inflator is so positioned and the base plate is positioned as describe above, the base plate further sandwiches a portion of the inflator 42 (i.e., the mounting flange 44) between the inner plate 24 and the base plate 56. Securing the fastener elements attaches the inflator 42 with the inner plate 24, the cushion 12, the cover 32 and the base plate 56.

Alternatively, the method of assembling an air bag module may include positioning the inflator 42 at a central opening 28, 16, 58 in the inner plate 24, cushion 16, and base plate 56, respectively, such that the inflator abuts the outer surface of the base plate 56. Positioning the inflator 42 is done prior to securing the fastener elements. Securing the fastener elements attaches the inflator 42 with the inner plate 24, the cushion 12, the cover 32 and the base plate 56.

While the best modes for carrying out the invention have been described in detail, those familiar with the art to which this invention relates will recognize various alternative designs and embodiments for practicing the invention within the scope of the appended claims.

The invention claimed is:

1. An air bag module for installation on a steering wheel assembly comprising:
   an inner plate;
   a base plate attachable to said inner plate;
   a cover;
   an inflatable cushion, said inner plate being receivable within said cushion, said cushion and inner plate being receivable within said cover, said cover containing said cushion prior to inflation thereof;
   a portion of said cushion and a portion of said cover abutting one another and being sandwiched directly between said inner plate and said base plate such that said portion of said cover is retained between said base plate and said inner plate;
   a fastener element adapted to extend through said inner plate, said cushion and said base plate, thereby attaching said inner plate and said base plate; and
   an inflator, said inflator having a mounting flange, said fastener element being adapted to further extend through said mounting flange, thereby attaching said inflator with said cushion, said inner plate, said base plate and said cover;
   wherein said cushion, said inner plate and said base plate are each formed with an alignable inflator opening adapted to receive a portion of said inflator, wherein said mounting flange of said inflator abuts an outer surface of said base plate when said inflator is received within said aligned inflator openings and is attached with said cushion, said inner plate, and said base plate by said fastener element; and
   wherein said air bag module is a preassembled unit configured such that said cushion, cover, and attached inner plate and base plate are attached sufficiently to one another prior to installation on the steering wheel assembly so as to be retained to one another when said cushion is inflated independent of any additional attachment to the steering wheel assembly.

2. The air bag module of claim 1, wherein said cushion, said inner plate, said base plate and said inflator are each formed with an alignable fastener element opening adapted to receive said fastener element through said opening when said fastener element openings are aligned.

3. The air bag module of claim 1, wherein said cushion, said inner plate and said base plate are each formed with an alignable inflator opening adapted to receive a portion of said inflator, wherein said mounting flange of said inflator abuts and is sandwiched between said cushion and said base plate when said inflator is received within said aligned inflator openings and is attached with said cushion, said inner plate and said base plate by said fastener element.

4. The air bag module of claim 1, further comprising a viscous damping element operable to isolate said inflator so that said inflator can function as a mass damper.

5. The air bag module of claim 4, further comprising a weighting element abutting said inflator and operable to increase the mass dampening function of said inflator.

6. The air bag module of claim 4, wherein said viscous damping element is sandwiched between said inner plate and said base plate, and further comprising:
   structure operable to at least partially limit compression of said viscous damping element by said attached inner plate and base plate.

7. The air bag module of claim 1, wherein said fastener element comprises a protrusion extending through said inner plate, said cushion and said base plate, wherein said fastener element further comprises a retaining element, said protrusion being secured by said retaining element to attach said inner plate, said cushion, said base plate and said cover together.

8. The air bag module of claim 7, wherein said protrusion is integrally formed with said inner plate.

9. The air bag module of claim 7, wherein one of said retaining element and a portion of the air bag module is comprised of a deformable material, and wherein said one of said retaining element and said portion of the air bag module deforms such that said protrusion is secured by said retaining element.

10. The air bag module of claim 1 wherein said fastener element comprises a threaded stud pressed into said inner plate.

11. The air bag module of claim 1, wherein said fastener element comprises a deformable tab, said deformable tab being deformed to attach said inner plate and said base plate.

12. The air bag module of claim 11, wherein said deformable tab includes a T-shaped foot having a neck portion, wherein said neck portion wedges into said base plate when said deformable tab is deformed, thereby further securing the attachment of said inner plate, said cushion, said base plate and said cover together.

13. The air bag module of claim 1, wherein said fastener element is a first fastener element; and further comprising:
   a plurality of additional fastener elements;
   wherein said first fastener element and said additional fastener elements are sufficient to attach said cushion, said inner plate and said base plate to one another, and wherein said air bag module is characterized by the absence of additional attachment mechanisms to further secure the attachment of said cushion, said inner plate and said base plate to one another.

14. The air bag module of claim 1, wherein said cover includes a cover extension having an inwardly-jutting flange portion, said cover extension being matable with said base plate such that said flange portion abuts and is cupped by said base plate and said cushion abuts and is disposed between said inner plate and said cover extension.

15. The air bag module of claim 14, wherein said base plate forms a segmented channel, wherein said flange portion has opposing inner and outer surfaces, and wherein said channel abuts said outer surface of said flange portion and said portion of said cushion is sandwiched between said inner plate and said inner surface of said flange portion when said cover extension is mated with said base plate.

16. The air bag module of claim 14, wherein said inner plate includes a peripheral wall having an outer surface, wherein said cover extension includes a shoulder portion, said flange portion jutting inward from said shoulder portion, said portion of said cushion being further sandwiched between said peripheral wall and said shoulder portion.

17. The air bag module of claim 14, wherein said base plate is a unitary structure.

18. The air bag module of claim 1, wherein said portion of said cover is cupped by said base plate.

19. An air bag module comprising:
   an inflatable cushion;
   an inner plate adapted to be receivable within said cushion;
   a cover adapted to contain said cushion prior to inflation, said cover including cover extensions, said inner plate and cushion being adapted to be receivable within said cover such that a portion of said cushion abuts and is disposed directly between said inner plate and said cover extensions;
   a base plate attachable to said inner plate such that said cover extensions abut said base plate and said portion of said cushion and cover extensions are sandwiched directly between said base plate and said inner plate sufficient to prevent separation of the cover from the base plate due to inflation of said cushion when the base plate and inner plate are attached;
   fastener elements adapted to extend between said inner plate, said cushion and said base plate, thereby attaching said inner plate and base plate;
   wherein said base plate forms a segmented channel, wherein said cover extensions have inwardly jutting flange portions, each of said flange portions having opposing inner and outer surfaces, said cover extensions being matable with said channel such that said flange portions abut and are cupped by said base plate, wherein said base plate abuts said outer surface of each of said flange portions and said portion of said cushion abuts and is sandwiched between said inner plate and said inner surface of each of said flange portions when said cover is mated with said channel;
   an inflator, said inflator having a mounting flange, said fastener elements being adapted to further extend through said mounting flange, thereby attaching said inflator with said cushion, said inner plate, said base plate and said cover sufficient to prevent separation from one another due to inflation of said cushion;
   wherein said air bag module is a preassembled unit;
   wherein said cushion, said inner plate and said base plate are each formed with an alignable inflator opening adapted to receive a portion of said inflator; and
   wherein said mounting flange of said inflator abuts an outer surface of said base plate when said inflator is received within said aligned inflator openings and is attached with said cushion, said inner plate, and said base plate by said fastener elements.

20. The air bag module of claim 1, wherein said inner plate extends generally away from and is characterized by a substantial absence of structure extending toward said portion of said cushion and said portion of said cover retained between said base plate and said inner plate.

21. The air bag module of claim 1, further comprising:
   an inflator having a mounting flange; and wherein said mounting flange is sandwiched between and surrounded by said inner plate and said base plate to thereby retain a position of said inflator.

22. A method of assembling an air bag module comprising:
   providing an inflatable cushion;
   placing an inner plate within said cushion;
   extending fastener elements between said inner plate and said cushion such that said fastener elements pass through aligned openings in said inner plate and in said cushion;
   placing said inner plate and said cushion at least partially within a cover such that a portion of said cushion is sandwiched between said inner plate and said cover;
   positioning a base plate against said cover to cup a portion of said cover such that said portion of said cushion and said portion of said cover are sandwiched between said inner plate and said base plate;
   securing said fastener elements to attach said inner plate, said cushion, said cover and said base plate together as an air bag module that is a preassembled unit; wherein said securing is sufficient to prevent separation of said cover from said base plate and said inner plate due to inflation of said cushion;
   positioning an inflator at an opening of said inner plate such that a mounting flange of said inflator abuts said cushion;
   wherein said base plate further sandwiches a portion of said inflator between said inner plate and said base plate with said mounting flange abutting an outer surface of said base plate; and
   wherein said securing said fastener elements attaches said inflator with said inner plate, said cushion, said cover and said base plate.

23. The method of claim 22 further comprising:
   positioning said inflator so that said mounting flange abuts an outer surface of said base plate, wherein said securing of said fastener elements attaches said inflator with said inner plate, said cushion, said cover, and said base plate.

24. The method of claim 22, wherein said fastener elements include a retaining feature, and wherein said securing said fastener elements includes positioning said retaining feature.

25. The method of claim 22, wherein said securing said fastener elements comprises deforming said fastener elements.

* * * * *